(12) United States Patent
Rodin et al.

(10) Patent No.: US 7,647,246 B2
(45) Date of Patent: Jan. 12, 2010

(54) SYSTEMS AND METHOD FOR INTEGRATING MULTIPLE INTERACTION ARRANGEMENTS

(75) Inventors: Michael Rodin, Greenwood Village, CO (US); David Baumgartner, Parker, CO (US); Eric Eldred, Parker, CO (US); Erik S. Crawford, Parker, CO (US); Karen Larsen, Highlands Ranch, CO (US); Kenneth Timbers, Englewood, CO (US); Kevin Harte, Denver, CO (US); Terra Geiger, Denver, CO (US)

(73) Assignee: First Data Corporation, Greenwood Village, CO (US)

(*) Notice: Subject to any disclaimer, the term of this patent is extended or adjusted under 35 U.S.C. 154(b) by 562 days.

(21) Appl. No.: 10/960,894

(22) Filed: Oct. 6, 2004

(65) Prior Publication Data

US 2006/0100960 A1 May 11, 2006

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

| | | | |
|---|---|---|---|
| 7,249,096 B1 * | 7/2007 | Lasater et al. ................. | 705/39 |
| 7,496,536 B2 * | 2/2009 | Lasater et al. ................. | 705/38 |
| 2002/0100808 A1 * | 8/2002 | Norwood et al. ............ | 235/486 |
| 2003/0158818 A1 | 8/2003 | George et al. | |
| 2004/0069853 A1 * | 4/2004 | Aharonson ................... | 235/454 |
| 2004/0186773 A1 | 9/2004 | George et al. | |
| 2005/0197919 A1 * | 9/2005 | Robertson ..................... | 705/26 |
| 2006/0206355 A1 * | 9/2006 | Cheung et al. ................. | 705/1 |

OTHER PUBLICATIONS

Business Wire. New York: Aug. 9, 2004. p. 1 http://proquest.umi.com/pqdweb?did=676396791&sid=1&Fmt=3&clientId=19649&RQT=309&VName=PQD.*
EP search Report mailed Jun. 16, 2009, Application No. 05796399.3, 8 pages.
Statement in Accordance with the Notice from the European Patent Office dated Oct. 1, 2007 Concerning Business Methods—Official Journal of the European Patent Office, Nov. 1, 2007, pp. 592-593, XP002456252, ISSN 0170-9291.

* cited by examiner

*Primary Examiner*—Mila Airapetian
(74) *Attorney, Agent, or Firm*—Townsend and Townsend and Crew LLP (57) ABSTRACT

Methods and systems are provided for executing such a bilateral action. A communication is received at a host system. A determination is made that the communication identifies a physical instrument that identifies an account of stored value. A request is transmitted to another host system to debit the account by an amount identified in the communication to support the bilateral action. A confirmation is received from the other host system that the account of stored value has been debited. An approval for the bilateral action is transmitted to an originating communications device.

47 Claims, 3 Drawing Sheets

SYSTEMS AND METHOD FOR INTEGRATING MULTIPLE INTERACTION ARRANGEMENTS

BACKGROUND OF THE INVENTION

This application relates generally to interaction arrangements. More specifically, this application relates to systems and methods for integrating multiple interaction arrangements.

There are a number of circumstances in which information is routed with interaction arrangements, which may generally be classified as "open" interaction arrangements or "closed" interaction arrangements. A closed interaction arrangement is one in which information is routed within a network having a limited number of nodes, while an open interaction arrangement is one in which there is no a priori restriction on the nodes. That is, in a closed interaction arrangement, information routed by the network must originate at a predefined hub or node of the network. By contrast, in an open interaction arrangement, information routed by the network may originate a previously unidentified node, although information may also originate from predefined hubs or nodes of the network.

When interaction arrangements are initially developed, they are typically formed to implement a specific operational construct. In some instances the development of distinct interaction arrangements may permit enhanced operations to be performed by integrating the distinct interaction arrangements. There is accordingly a need in the art for systems and methods for integrating multiple interaction arrangements.

BRIEF SUMMARY OF THE INVENTION

Embodiments of the invention provide methods and systems for executing a bilateral action between a first party and a second party. In one set of embodiments in which a method is provided for executing such a bilateral action, a communication is received at a first host system from a communications device local to the first party. The communications device is one of a plurality of communications devices that define nodes of a first network providing information pathways between the nodes of the first network and the first host system. A determination is made at the first host system that the communication identifies a physical instrument issued to the second party to identify the second party and to identify an account of stored value for use by the second party. The account of stored value is for use by the second party in supporting execution of bilateral actions between the second party and any of a plurality of third parties associated with nodes of a closed second network. The closed second network provides information pathways between the nodes of the closed second network and a second host system. The second host system is distinct from the first host system and the second network is distinct from the first network. A request is transmitted from the first host system to the second host system to debit the account of stored value by an amount identified in the communication to support the bilateral action. A confirmation is received at the first host system from the second host system that the account of stored value has been debited. An approval for the bilateral action is transmitted from the first host system to the communications device.

In some instances, the first network may be a closed network. In one embodiment, the request includes an identification of characteristics of the bilateral action. In that embodiment, receipt of the confirmation acknowledges a determination by the second host system that the characteristics are consistent with a predetermined set of requirements for bilateral actions involving the second party. In some cases, the predetermined set of requirements may have been established by someone other than the second party. The account of stored value may be one of a plurality of accounts of stored value identified by the physical instrument. In some instances, the account may be automatically replenished by a defined amount at a specified time from a specified source of value. The bilateral action may be settled at a time later than the approval is transmitted.

A variety of different types of bilateral actions may be executed. In one embodiment, the bilateral action comprises a financial transaction for a purchase of a product by the second party from the first party. For instance, the product may be a ticket for an event such as a sporting event, in which case a notification may additionally be transmitted from the second host system to an operator of the event. In another embodiment, the bilateral action comprises a financial transaction for making a recurrent payment by the second party for services provided by the first party. In a further embodiment, the bilateral action comprises a cash advance made to the second party from the first party. In some instances, the first party may be a government, with the bilateral action comprising payment of a tax refund from the first party to the second party. In other instances, the second party may be a government, with the bilateral action comprising payment of taxes owed from the first party to the second party. In a further case, the communication may include an offer to exchange personal property owned respectively by the first and second parties with each other.

A variety of checks may be made prior to receiving the confirmation. For instance, in one embodiment, the physical instrument further identifies an age of the second party and the bilateral action has an age restriction. The request includes a specification of the age of the second party obtained from the physical instrument. Receipt of the confirmation thus acknowledges a determination by the second host system that the age of the second party meets the age restriction. In another embodiment, the communication further includes a biometric identification of the second party obtained from a physical measurement of the party. The request includes the biometric identification. Receipt of the confirmation thus acknowledges a determination by the second host system that the biometric identification included in the request is consistent with a stored biometric identification of the second party.

In a second set of embodiments, a method is also provided of executing a bilateral action between a first party and a second party. A request is received at a first host system from a second host system. The first host system is comprised by a first network providing information pathways between nodes of the first network and the first host system. The second host system is comprised by a second network providing information pathways between nodes of the second network and the second host system. The first host system is distinct from the second host system and the first network is distinct from the second network. The request identifies an account of stored value to be debited by a specified amount to support the bilateral transaction. The account of stored value is identified with the first party to support bilateral transactions between the first party and any of a plurality of third parties associated with the nodes of the first network. A determination is made at the first host system that the account of stored value has value that is at least equal to the specified amount. The account of stored value is debited by the specified amount. A confirmation is transmitted from the first host system to the second host system that the account of stored value has been debited. The different types of networks, different types of bilateral actions, and different types of checks that may be performed within the first set of embodiments may also apply to the second set of embodiments. In some instances, the account of stored value may be identified by a physical instrument issued to the first party while in other embodiments the account of stored value may be identified by a biometric of the first party.

In a third set of embodiments, a system is provided for executing a bilateral action between a first party and a second party. The system includes a first network and a second network. The first network comprises a first host system having a first processor and a plurality of communications devices that define nodes of the first network. Information pathways are provided between the nodes of the first network and the first host system. The second network comprises a second host system having a second processor and a plurality of nodes, each such node being associated with at least one of a plurality of third parties. Information pathways are provided between the nodes of the second network and the second host system. The second network is distinct from the first network and the second host system is distinct from the first host system. The first and second processors are configured to execute programming instructions to execute the bilateral action. A communication is received at the first host system from one of the communications devices. The communication is identified at the first host system as identifying a physical instrument issued to the second party to identify the second party and to identify an account of stored value for use by the second party in supporting execution of bilateral actions between the second party and the third parties. A request is transmitted from the first host system to the second host system to debit the account of stored value by an amount identified in the communication to support the bilateral action. A determination is made at the second host system that the account of stored value has value that is at least equal to the specified amount. The account of stored value is debited by the specified amount. A confirmation is transmitted from the second host system to the first host system that the account of stored value has been debited. An approval for the bilateral action is transmitted from the first host system to the communications device. A common settlement engine may additionally be provided and adapted to settle bilateral transactions executed with either or both of the first and second networks.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a numerical or alphabetic sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide an integration of multiple interaction arrangements that enable execution of bilateral actions between a first party and a second party. In a number of the descriptions that follow for specific embodiments, the bilateral action comprises a financial transaction between the parties, such as where one of the parties is purchasing a product from the other and providing payment for the product. Furthermore, embodiments of the invention are sometimes illustrated using the specific case where one of the interaction arrangements comprises a network through which campus functions may be performed. Such a network typically operates by having identification cards issued to students on a campus, with the identification card also acting to identify a stored-value account that may be used to support financial transactions. The stored-value account is generally accepted only by a limited number of local merchants, thereby allowing the identification cards to be used to purchase books at the local bookstore, meals at local meal-plan suppliers, entertainment at local venues, and the like. In some instances, the stored-value account may conveniently be initiated or replenished by a parent or guardian, in which case a facility may be provided to allow the parent or guardian to impose restrictions on how the stored-value account is used. In these embodiments, the campus interaction arrangement provides an example of a closed interaction arrangement.

Figure 1:
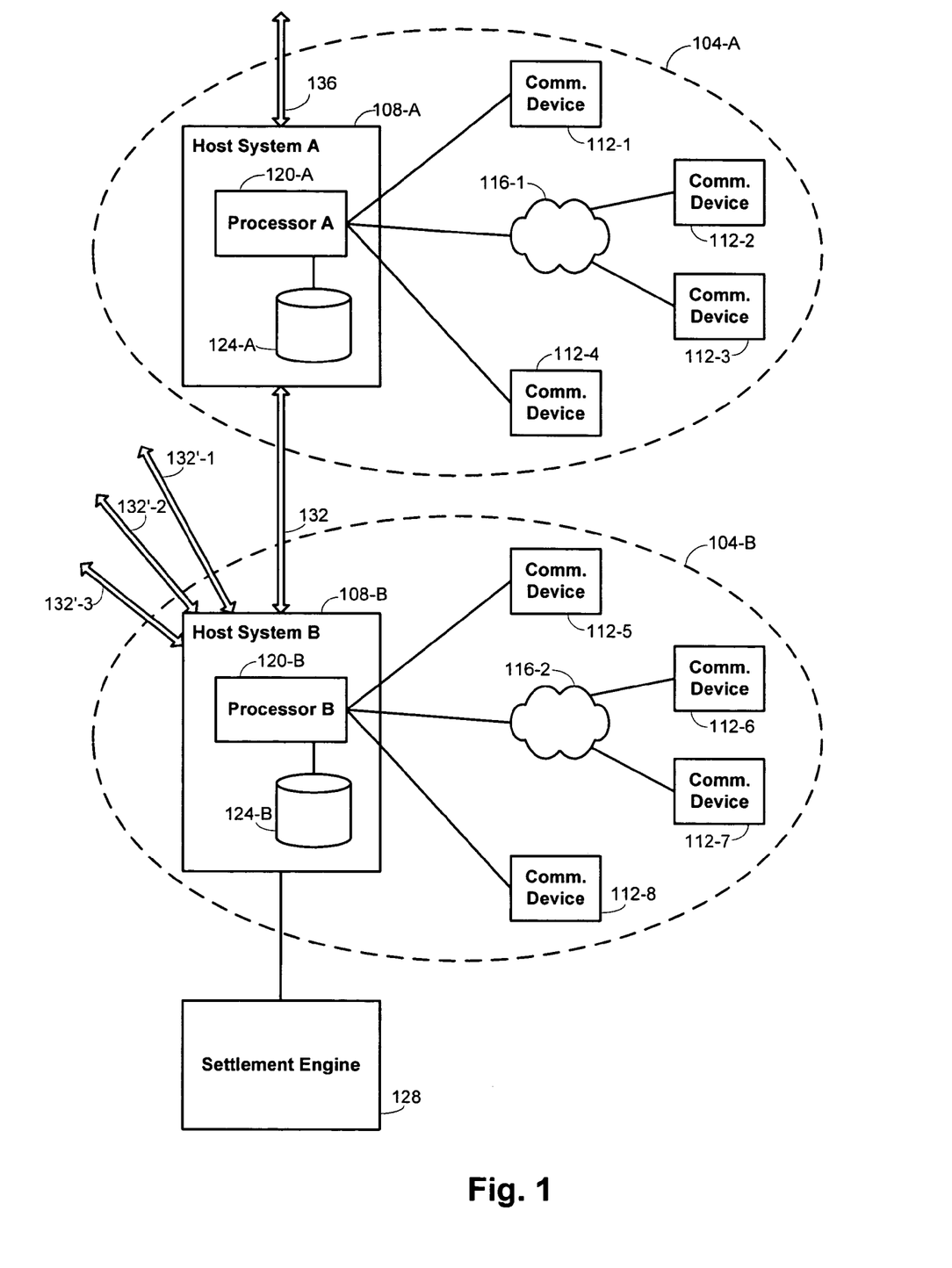
FIG. 1 provides a schematic illustration of a structural integration of multiple interaction arrangements according to an embodiment of the invention.

FIG. 1 provides a schematic illustration of two interaction arrangements that have been integrated in accordance with an embodiment of the invention. For convenience, the two arrangements are designated "A" and "B," with these designations being used as sublabels in identifying certain components of the arrangements. Each interaction arrangement 104 generally includes a host system 108 that may act as a hub for the interaction arrangement and a plurality of nodes that are coupled with communications devices 112. Information pathways among the nodes may be provided through information pathways that include the host system 108, and may in some instances include pathways through one or more intermediate networks 116. For example, within interaction arrangement 104-A, nodes associated with communications devices 112-2 and 112-3 may exchange information within the arrangement 104-A via communications pathways that proceed through network 116-1. Similarly, within interaction arrangement 104-B, nodes associated with communications devices 112-6 and 112-7 may exchange information within the arrangement 104-B via communications pathways that proceed through network 116-2. The communications devices 112 may often be provided locally to where the bilateral action between parties is initiated, such as in the case where the bilateral interaction comprises a financial transaction for the purchase of goods at a point of sale; in other instances, a communications device 112 may be local only to one of the parties or may be local to neither of the parties, such as in the case where the bilateral action comprises a transaction executed by the parties over a public network.

The host system 108 of each of the interaction arrangements includes a processor 120 and one or more storage devices 124 on which information is maintained in order to operate the interaction arrangement. For example, in the campus-card illustration, the storage device 124 may include databases that record identifiers for each of the cards distributed to students, their identification numbers, and the stored-value accounts that may be accessed with the cards. In those embodiments where restrictions have been placed on usage of the stored-value accounts, the databases may additionally record what those restrictions are. In various embodiments, additional information may also be stored within the databases, such as an age of the student, a biometric identification of the student, etc. Further description of how such additional information may be used when interaction arrangements are integrated is provided below.

The two interaction arrangements 104 are integrated with one or more communications pathways 132 between their respective host systems 108. While in many applications the interaction arrangements 104 are equal in status, in other applications one of the interaction arrangements may be primary in that most of the enhanced functionality of the integration results from access to nodes for executing bilateral actions of the primary interaction arrangement. For example, the campus card described above may designed for use with nodes of interaction arrangement 104-A, providing access for bilateral transactions only local to the campus. When interaction arrangement 104-B provides a wider scope by providing access to nodes that are more geographically disperse, it acts as the primary interaction arrangement. In this example, the primary interaction arrangement 104-B might correspond to a nationally implemented stored-value system that permits customers to use stored-value cards at nationally distributed chains of merchants.

The integrated interaction arrangements may include a plurality of secondary interaction arrangements, each of which has a similar communications capability with the primary interaction arrangement. This is illustrated in FIG. 1 by communications pathways 132', each of which may provide for communications between the host system 108-B of the primary interaction arrangement with one of the plurality of secondary interaction arrangements. Because interaction arrangement 104-B is acting as the primary interaction arrangement, its host system 108-B may be provided in communication with a settlement engine 128 that periodically effects settlement of the bilateral actions that are executed with any of the integrated interaction arrangements. In particular, the settlement engine 128 may thus advantageously be configured to perform settlement functions for bilateral actions that involve any of the interaction arrangements 104, irrespective of whether those interaction arrangements are open or closed. That is, in particular embodiments a single settlement source in the form of the settlement engine 128 may perform settlement of bilateral actions involving any number of closed interaction arrangements and a single or multiple open interaction arrangements.

In some instances, the organization of the arrangements may be such that a secondary interaction arrangement is provided only with a communications pathway to the primary interaction arrangement that includes another of the secondary interaction arrangements. This is illustrated, for instance, with communications pathway 136 between interaction arrangement 104-A and another interaction arrangement, that other interaction arrangement being able to communicate with interaction arrangement 104-B only by routing communications through interaction arrangement 104-A.

Figure 2:
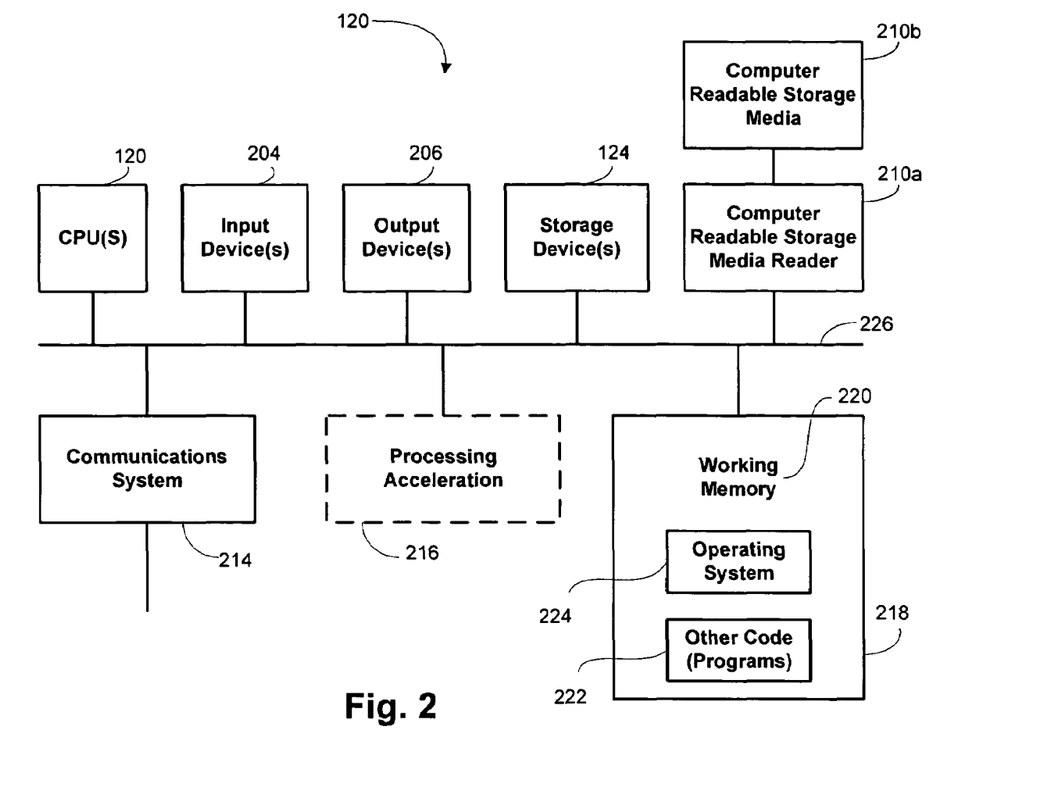
FIG. 2 provides a schematic illustration of a computational device that may be configured to implement methods of the invention as part of the structural integration shown in FIG. 1.

FIG. 2 provides a schematic illustration of a structure that may be used to implement each host system 108. FIG. 2 broadly illustrates how individual system elements may be implemented in a separated or more integrated manner. The host system 108 is shown comprised of hardware elements that are electrically coupled via bus 226, including a processor 120, an input device 204, an output device 206, a storage device 124, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged with communications devices 112, other host systems 108, and the like as described above.

The host system 108 also comprises software elements, shown as being currently located within working memory 220, including an operating system 224 and other code 222, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

How the structural arrangement described in connection with FIGS. 1 and 2 may be used for executing a bilateral action between parties is illustrated with the flow diagram of FIG. 3. At block 304, the parties, identified as Party A and Party B, initiate a bilateral action. If both parties participate in the same interaction arrangement 104, then the bilateral action may simply be executed in the normal fashion that governs the operation of that interaction arrangement. The integration of separate interaction arrangements is more fully illustrated by considering the case where the parties are registered for participation in different interaction arrangements. For instance, suppose that Party A is a consumer participant with interaction arrangement A 104-A, and has been issued a physical instrument in the form of a card that identifies him as a participant. In one embodiment, Party A may be a student enrolled at a college or university, with interaction arrangement A 104-A providing a mechanism for using a stored-value account to support bilateral actions with local parties also registered with the interaction arrangement. Party B may be a merchant that is registered with a nationally based retail chain to accept cards identifying stored-value accounts associated with the retail chain. In a specific example, Party A may hold a StateU stored-value card that may be used at StateU merchants; Party B may be a merchant who accepts FamousCoffeeShop stored-value cards. The integration of the interaction arrangements 104 allows Party A to use his StateU stored-value card at a FamousCoffeeShop merchant.

After the bilateral action has been initiated, Party A may thus supply information from the physical instrument to support the bilateral action at block 308. For example, if the physical instrument comprises a magnetic-stripe card and the parties are local to each other, the magnetic-stripe may be read from the card with a magnetic-stripe reader comprised by one of the communications devices 112 provided at the location. Similarly, if the physical instrument comprises a chip card and the parties are local to each other, the chip may by read from the card with a chip reader comprised by one of the communications devices 112. In instances where the parties are not local to each other, such as where the bilateral action is initiated over a public network like the telephone network or the Internet, the information may be provided by reading numbers from the instrument or by keying the numbers for transmission over the network. In the case of a telephone network, the keyed numbers may be decoded according to their dual-tone multiple-frequency ("DTMF") values.

Information regarding the bilateral action and information from the physical instrument are used by the communications device 112 at block 312 to generate a communication that is transmitted to host system A 108-A through network A at block 316. This communication is used by host system A 108-A at block 320 to generate a request to debit a stored-value account that is managed by interaction arrangement B 104-B. The request is transmitted by host system A 108-A to host system B 108-B at block 324. Upon receipt of the request, host system B 108-B may perform a number of checks to determine whether to execute the request. These checks may depend on the nature of the physical instrument, aspects of the bilateral action, aspects of the identified stored-value account, and the like, some of which may be included with the request transmitted to host system B 108-B. For example, certain types of bilateral actions may have age restrictions, such as where the bilateral action comprises a transaction for the purchase of tobacco or alcohol; in other instances may take the form of having different prices for certain goods or services for people of different ages. In addition, certain portions of value may be earmarked for certain types of bilateral actions. This is especially useful in the context of a card issued to students with value supplied by parents or guardians since the parents or guardians may dictate that a certain portion of the value be earmarked for the purchase of meals, a certain portion for the purchase of books, a certain portion for entertainment, etc. In some instances, the limitations may prohibit the value from being used for certain types of bilateral actions, such as where parents include a restriction preventing the value from being used for the purchase of tobacco or alcohol, etc.

Accordingly, at block 328, host system B 108-B may verify that the identified stored-value account has sufficient value to support the bilateral action. If the stored-value account includes limitations on how the value may be used in supporting bilateral actions, a check may be made by host system B 108-B at block 332 to verify that characteristics of the bilateral action are consistent with those limiting requirements. If the bilateral action itself includes an age restriction, host system B 108-B may additionally check that Party A meets that age restriction from information included with the request at block 336. In still other instances, the request may include biometric information obtained directly from Party A when the bilateral action is initiated, such as by scanning for a fingerprint, measuring a facial geometry, scanning a retina or the like. This biometric information may be transmitted from the communications device 112 to host system A 108-A and to host system B 108-B as part of the request, permitting host system B 108-B to compare the transmitted biometric information with stored biometric information at block 340 to confirm the identity of Party A.

If any one of the necessary requirements for executing the bilateral action is not satisfied, as checked at block 344, host system B 108-B generates and returns a refusal of support for the bilateral action back to host system A 108-A at block 370. In response to receipt of the refusal, host system A 108-A generates a denial of the bilateral action at block 374 and transmits the denial back to the originating communications device 112 at block 378. This information may then be used so that the bilateral action is not executed.

Conversely, if all requirements for execution of the bilateral action are determined at block 344 to have been met, the amount of value used to support the bilateral action is debited from the stored-value account at block 348. A confirmation that this portion of the bilateral action has been executed is generated and transmitted at block 358 to host system A 108-A. An approval for the remainder of the bilateral action is generated by host system A 108-A at block 362 and transmitted to the originating communications device 112 at block 366.

The above description has illustrated aspects of the invention by describing the execution of bilateral actions upon presentation of a physical instrument, perhaps in combination with the use of a biometric identification of a party. In other embodiments, the system may operate entirely on biometric identification without the issuance of any physical instruments. In such instances, the biometric identification is stored as information supplementary to the account of stored value and is compared with biometric information extracted when a bilateral action is executed. In this way, a party may execute bilateral actions within any of the interaction arrangements merely by presenting himself and permitting the measurement of a biometric, such as a fingerprint, retinal scan, facial geometry, and the like.

EXAMPLES

Figure 3:
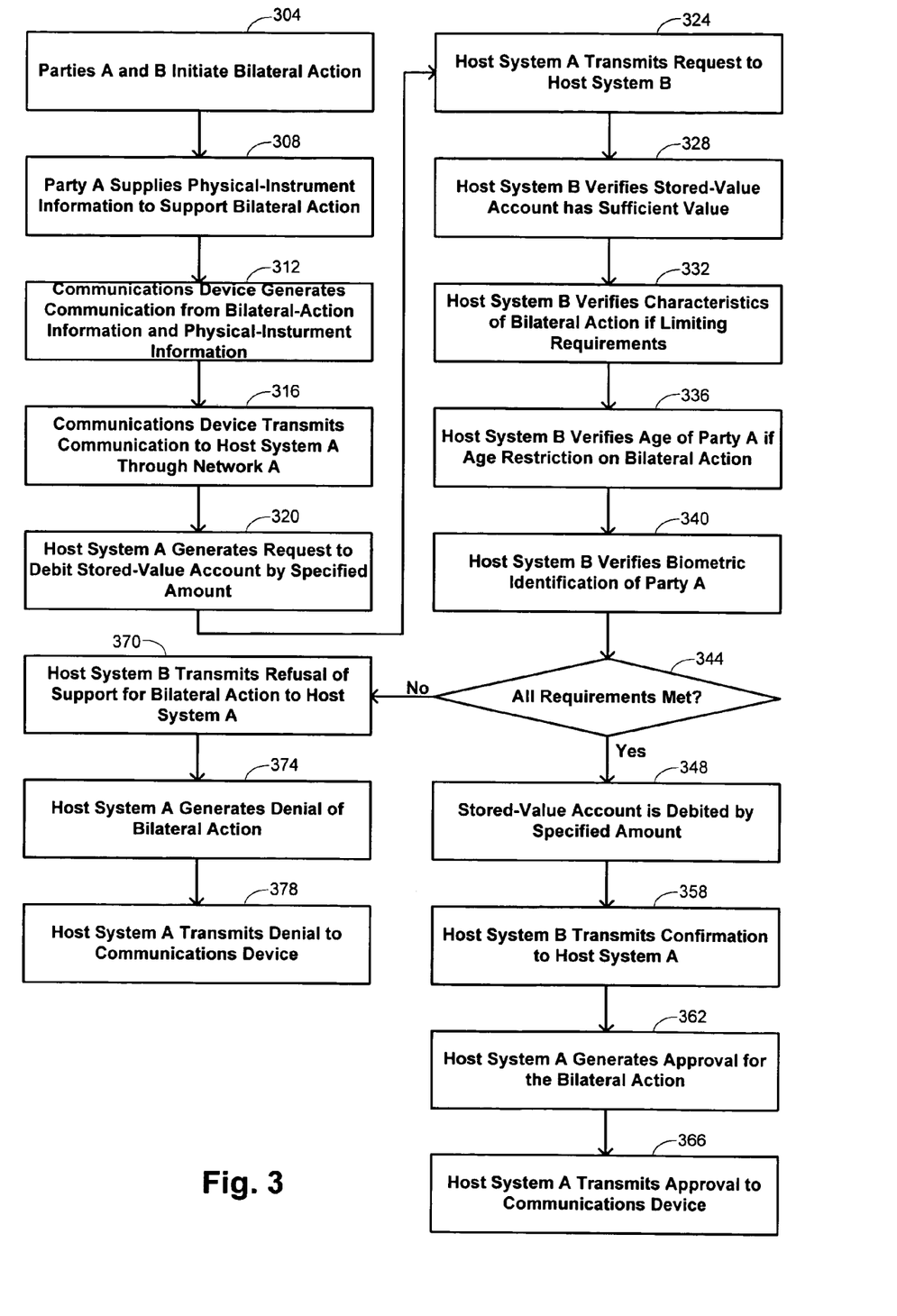
FIG. 3 provides a flow diagram summarizes methods of the invention in certain embodiments.

The structure illustrated in FIGS. 1 and 2 and the method illustrated in FIG. 3 may be applied in a number of different circumstances. One example that has been partially discussed in the previous description is where one of the parties is a student at a college or university, with the physical instrument being a card that acts as a combined identification and stored-value card. The identification aspect of the card may be used to gain entry to dormitories and other buildings, to gain entry to parking lots, and the like. The stored-value aspect of the card permits it to be used with primarily local entities that are registered with the local interaction arrangement. These may include local restaurants, stores, movie theaters, as well as vending machines distributed on campus, and the like. When that interaction arrangement is integrated with another interaction arrangement, the stored-value aspect of the card permits it to be used with an expanded set of entities that include all those registered with the additional interaction arrangement. In some instances, the system may be used for making recurrent payments, such as for utilities, telephone, cable, and the like. Such usage may be additionally advantageous since the architecture of the arrangement permits reporting functions, permits stop payments to be issued in cases of disputes, and the like. Numerous other examples of functionality for the system may be traced to the architecture that is used. For instance, in some embodiments the bilateral action may comprise an exchange of goods, permitting such bilateral actions as a textbook swap, a computer-equipment exchange, and the like.

There may be different sources of the value that are provided. While the above description has mentioned parents in the context of a campus instrument, another source of value may be a student-loan provider. In such an instance, the ability for the provider of value to limit the way in which it is used may permit the loan provider to specify that the loan is to be used only for payment of tuition, only for payment of tuition and/or housing, etc. depending on the conditions of the loan. In other contexts, such as a business context, the holder of the instrument may be an employee of a business that provides the value for payment of business-related expenses. In the same way, the business may limit the use of the value in accordance with its policies to prevent unauthorized use of the value for nonbusiness expenses. The architecture of the integrated arrangement permits reports to be generated for the business of where the value was used, perhaps organized according to predefined categories, thereby allowing the business to monitor usage and develop budgeting strategies. There are, furthermore, a variety of different ways in which the value may be provided. It may be provided as a lump payment, which may be convenient for loans and similar types of payments; it may alternatively be provided periodically, which may be convenient for parents to provide funding to students or as a per diem provided by an employer.

The ability for use of value to be controlled by an external party has been identified as an easy mechanism for the supplier of the value to limit its use, and the limitations on the usage may be diverse. For instance, in addition to limiting the types of bilateral actions that may be executed with the support of the value, there may be time limitations on use of the value, geographical limitations on use of the value, and the like. In some cases, the limitations may be very specific, permitting the value to be used to support the purchase of a movie ticket only once in a week and only on a Friday or Saturday, for example. In one embodiment, some or all of the value may be accessible as a cash allowance. Implementing restrictions on how value may be used may be performed by allocating certain portions of funds to different subaccounts, with different restrictions imposed on the use of the value from the different subaccounts. A general description of such allocations is provided in copending, commonly assigned U.S. patent application Ser. No. 10/421,601, flied Apr. 22, 2003, the entire disclosure of which is incorporated herein by reference for all purposes.

In some embodiments, the systems and methods of the invention may be used to support ticketing functions when the bilateral action comprises a financial transaction for the purchase of a ticket to an event by a party. In such embodiments, a party may purchase the ticket using the physical instrument at a location as described above, with the event location being different from the ticket-purchase location. In addition to transmitting a confirmation to host system A 108-A, host system B 108-B may transmit a notification to an operator of the event that the ticket has been sold. Examples of tickets that may be sold in this way include tickets to sporting events, tickets to amusement parks, tickets for access to parks, tickets for access to skiing sites, and the like. The ability of the system to accommodate such tickets may also form part of the exchange described above, permitting owners of tickets to different events to arrange for the exchange of the tickets.

A further example of an application that may is outside the campus context permits parties to pay taxes to a government or to receive a tax refund from a government. In such embodiments, one of the parties is the government and the other party is the taxpayer. A payment of taxes takes the form of using stored value and transmitting it to the government in satisfaction of the taxes, while payment of a refund takes the form of the government adding to the stored-value account.

The stored-value aspects of the systems and methods of the invention may be integrated in some embodiments with loyalty programs, such as described in copending, commonly assigned U.S. patent application Ser. No. 10/740,378, filed Dec. 17, 2003 as a continuation-in-part of U.S. patent Application Ser. No. 10/079,927, filed Feb. 19, 2002, the entire disclosure of both of which are incorporated herein by reference for all purposes.

The ability of embodiments of the invention to accommodate embodiments especially suitable for students and to accommodate embodiments suitable for nonstudents allows use of the methods and systems by an individual to evolve. For instance, a student may initially participate in such a system with the stored-value account being funded by another party such as a parent, loan provider, etc. When the student graduates, she may continue to use the system with a self-funded stored value account for other purposes as described.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of executing a bilateral action between a first party and a person, the method comprising:

receiving at a first host system associated with the first party, a communication from a communications device local to the first party, wherein the communications device is one of a plurality of communications devices that define nodes of a first network providing information pathways between the nodes of the first network and the first host system;

determining at the first host system that the communication identifies a student identification instrument issued to the person to identify the person and to identify an account of stored value for use by the person in supporting execution of bilateral actions between the person and a second party associated with nodes of a closed second network, wherein the closed second network providing information pathways between the nodes of the closed second network and a second host system, the second host system is distinct from the first host system, the second network is distinct from the first network, the student identification instrument is issued on behalf of the second party, the first host system and the second host system have equal status within their respective networks;

the first host system and the first network are comprised by a first interaction arrangement that administers stored value accounts, the second host system and the second network are comprised by a second interaction arrangement that administers stored value accounts; and transmitting a request from the first host system to the second host system to debit the account of stored value by an amount identified in the communication, the amount supporting the bilateral action;

receiving a confirmation at the first host system from the second host system that the account of stored value has been debited; and transmitting an approval for the bilateral action from the first host system to the communications device.

2. The method recited in claim 1 wherein the first network is a closed network.

3. The method recited in claim 1 wherein:

the request includes an identification of characteristics of the bilateral action; and receiving the confirmation acknowledges a determination by the second host system that the characteristics are consistent with a predetermined set of requirements for bilateral actions involving the person.

4. The method recited in claim 3 wherein the predetermined set of requirements was established by someone other than the person.

5. The method recited in claim 1 wherein the bilateral action comprises a financial transaction for a purchase of a product by the person from the first party.

6. The method recited in claim 5 wherein the product is a ticket for an event.

7. The method recited in claim 6 wherein the event is a sporting event.

8. The method recited in claim 6 wherein a notification is transmitted from the second host system to an operator of the event, the operator of the event being neither the first party nor the person.

9. The method recited in claim 1 wherein the account of stored value is one of a plurality of accounts of stored value identified by the physical instrument.

10. The method recited in claim 1 wherein the account is automatically replenished by a defined amount at a specified time from a specified source of value.

11. The method recited in claim 1 wherein the communication includes an offer to exchange personal property owned by the first party and the person with each other.

12. The method recited in claim 1 wherein:
the physical instrument further identifies an age of the person;
the bilateral action has an age restriction;
the request includes a specification of the age of the person obtained from the physical instrument; and
receiving the confirmation acknowledges a determination by the second host system that the age of the person meets the age restriction.

13. The method recited in claim 1 wherein:
the communication further includes a biometric identification of the person obtained from a physical measurement of the person;
the request includes the biometric identification; and
receiving the confirmation acknowledges a determination by the second host system that the biometric identification included in the request is consistent with a stored biometric identification of the person.

14. The method recited in claim 1 wherein the bilateral action comprises a financial transaction for making a recurrent payment by the person for services provided by the first party.

15. The method recited in claim 1 wherein the bilateral action comprises a cash advance made to the person from the first party.

16. The method recited in claim 1 wherein:
the first party is a government; and
the bilateral action comprises payment of a tax refund from the first party to the person.

17. The method recited in claim 1 further comprising settling the bilateral action at a time later than transmitting the approval.

18. A method of executing a bilateral action between a first party and a second party, the method comprising:
receiving at a first host system a request directly from a second host system, wherein:
the request was initiated using a student identification instrument issued on behalf of a university;
the first host system is comprised by a first network providing information pathways between nodes of the first network and the first host system;
the second host system is comprised by a second network providing information pathways between nodes of the second network and the second host system;
the first host system is distinct from the second host system;
the first network is distinct from the second network;
the first host system and the first network are comprised by a first interaction arrangement that administers stored value accounts;
the second host system and the second network are comprised by a second interaction arrangement that administers stored value accounts;
the first host system and the second host system are equal in status in their respective networks;
the first network is a closed network;
the first network is operated on behalf of the university;
the request identifies an account of stored value to be debited by a specified amount to support the bilateral transaction; and
the account of stored value is identified with the first party to support bilateral transactions between the first party and any of a plurality of third parties associated with the nodes of the first network;
determining at the first host system that the account of stored value has value that is at least equal to the specified amount;
debiting the account of stored value by the specified amount; and
transmitting a confirmation from the first host system directly to the second host system that the account of stored value has been debited.

19. The method recited in claim 18 wherein the second network is a closed network.

20. The method recited in claim 18 wherein the request includes an identification of characteristics of the bilateral action, the method further comprising determining at the first host system that the characteristics are consistent with a predetermined set of requirements for bilateral actions involving the first party.

21. The method recited in claim 20 wherein the predetermined set of requirements was established by someone other than the first party.

22. The method recited in claim 18 wherein the bilateral action comprises a financial transaction for a purchase of a product by the first party from the second party.

23. The method recited in claim 22 wherein the product is a ticket for an event.

24. The method recited in claim 23 wherein the event is a sporting event.

25. The method recited in claim 23 further comprising transmitting a notification from the first host system to an operator of the event, the operator of the event being neither the first party nor the second party.

26. The method recited in claim 18 wherein the account of stored value is one of a plurality of accounts of stored value identified with the first party.

27. The method recited in claim 18 wherein the account is automatically replenished by a defined amount at a specified time from a specified source of value.

28. The method recited in claim 18 wherein the request further includes an offer to exchange personal property owned respectively by the first and second parties with each other.

29. The method recited in claim 18 wherein:
the account of stored value includes information identifying an age of the first party;
the bilateral action has an age restriction;
the request includes a specification of the age of the first party,
the method further comprising determining at the first host system that the age of the first party meets the age restriction prior to transmitting the confirmation.

30. The method recited in claim 18 wherein the request further includes a biometric identification of the first party, the method further comprising determining at the first host system that the biometric identification is consistent with a stored biometric identification of the first party.

31. The method recited in claim 18 wherein the bilateral action comprises a financial transaction for making a recurrent payment by the first party for services provided by the second party.

32. The method recited in claim 18 wherein the bilateral action comprises a cash advance made to the first party from the second party.

33. The method recited in claim 18 wherein:
the first party is a government; and
the bilateral action comprises payment of taxes owed from the second party to the first party.

34. The method recited in claim 18 wherein:
the second party is a government; and
the bilateral action comprises payment of a tax refund from the second party to the first party.

35. The method recited in claim 18 wherein the account of stored value is identified by a physical instrument issued to the first party.

36. The method recited in claim 18 wherein the account of stored value is identified by biometric of the first party.

37. A system for executing a bilateral action between a first party and a second party, the system comprising:
a first network comprising:
a first host system having a first processor;
a plurality of communications devices that define nodes of the first network; and
information pathways between the nodes of the first network and the first host system;
wherein the first host system and the first network are comprised by a first interaction arrangement that administers stored value accounts;
a second network comprising:
a second host system having a second processor;
a plurality of nodes of the second network, each such node being associated with at least one of a plurality of third parties; and
information pathways between the nodes of the second network and the second host system,
wherein the second host system and the second network are comprised by a second interaction arrangement that administers stored value accounts;
wherein:
the second network is distinct from the first network;
the second host system is distinct from the first host system;
the first host system and the second host system have equal status within the first network and the second network, respectively; and
the first and second processors are configured to execute programming instructions in accordance with the following:
a communication is received at the first host system from one of the communications devices;
the communication is identified at the first host system as identifying a student identification instrument issued to the second party to identify the second party and to identify an account of stored value for use by the second party in supporting execution of bilateral actions between the second party and the third parties, wherein the student identification instrument is issued on behalf of a same institution the second network is operated on behalf of;
a request is transmitted from the first host system directly to the second host system to debit the account of stored value by an amount identified in the communication to support the bilateral action;
a determination is made at the second host system that the account of stored value has value that is at least equal to the specified amount;
the account of stored value is debited by the specified amount;
a confirmation is transmitted from the second host system directly to the first host system that the account of stored value has been debited; and
an approval for the bilateral action is transmitted from the first host system to the communications device.

38. The system recited in claim 37 wherein at least one of the first and second networks is a closed network.

39. The system recited in claim 37 wherein the first and second networks are closed networks.

40. The system recited in claim 37 wherein:
the request includes an identification of characteristics of the bilateral action; and
the confirmation is transmitted from the second host system to the first host system only if the characteristics are consistent with a predetermined set of requirements for bilateral actions involving the second party.

41. The system recited in claim 37 wherein the bilateral action comprises a financial transaction for a purchase of a product by the second party from the first party.

42. The system recited in claim 37 wherein the account of stored value is one of a plurality of accounts of stored value identified by the physical instrument.

43. The system recited in claim 37 wherein:
the physical instrument further identifies an age of the second party;
the bilateral action has an age restriction;
the request includes a specification of the age of the second party obtained from the physical instrument; and
the confirmation is transmitted from the second host system to the first host system only if the age of the second party meets the age restriction.

44. The system recited in claim 37 wherein:aq
the communication further includes a biometric identification of the second party obtained from a physical measurement of the second party;
the request includes the biometric identification; and
the confirmation is transmitted from the second host system to the first host system only if the biometric identification included in the request is consistent with a stored biometric of the second party.

45. The system recited in claim 37 wherein the bilateral action comprises a financial transaction for making a recurrent payment by the second party for services provided by the first party.

46. The system recited in claim 37 wherein the bilateral action comprises a cash advance made to the second party from the first party.

47. The system recited in claim 37 further comprising a settlement engine adapted to settle bilateral transactions executed with either or both of the first and second networks.

* * * * *

UNITED STATES PATENT AND TRADEMARK OFFICE
CERTIFICATE OF CORRECTION

PATENT NO.        : 7,647,246 B2
APPLICATION NO.  : 10/960894
DATED             : January 12, 2010
INVENTOR(S)       : Rodin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 875 days.

Signed and Sealed this

Sixteenth Day of November, 2010

David J. Kappos
*Director of the United States Patent and Trademark Office*